United States Patent [19]
Brewer

[11] Patent Number: 5,113,752
[45] Date of Patent: May 19, 1992

[54] BYPASS BASKET STRUCTURE FOR ICED TEA MAKERS

[75] Inventor: Alan W. Brewer, Divernon, Ill.

[73] Assignee: Bunn-O-Matic Corporation, Springfield, Ill.

[21] Appl. No.: 630,837

[22] Filed: Dec. 20, 1990

[51] Int. Cl.$^5$ .......................... A47J 31/24; A47J 31/02
[52] U.S. Cl. ........................................ 99/295; 99/306; 210/476; 210/481
[58] Field of Search ................. 99/279, 295, 306, 300, 99/301, 304, 307, 316, 317; 426/433; 210/481, 474, 476

[56] References Cited

U.S. PATENT DOCUMENTS

| | | |
|---|---|---|
| 3,374,897 | 3/1968 | Martin . |
| 3,610,132 | 10/1971 | Martin et al. . |
| 3,861,285 | 1/1975 | Martin . |
| 3,920,554 | 11/1975 | Sanders ............................. 210/476 |
| 4,303,525 | 12/1981 | Stover . |
| 4,309,939 | 1/1982 | Stover . |
| 4,579,048 | 4/1986 | Stover . |
| 4,603,620 | 8/1986 | Daugherty . |
| 4,642,190 | 2/1987 | Zimmerman . |
| 4,765,896 | 8/1988 | Hartley et al. . |
| 4,832,845 | 5/1989 | Hendretti ............................ 99/306 |
| 4,920,871 | 5/1990 | Anson et al. . |

Primary Examiner—Robert W. Jenkins
Attorney, Agent, or Firm—Trexler, Bushnell, Giangiorgi & Blackstone, Ltd.

[57] ABSTRACT

The invention relates generally to an improved method for connecting a two-part brewing funnel generally used to make cold, freshly brewed beverages. The funnel consists of an inner part and an outer part. The outer part has a plurality of notches and tabs disposed about its upper flange. The notches are disposed with one side being in abutment with a tab. The inner part has a plurality of tangs disposed about its upper portion, with their disposition coordinated with the disposition of the notches of the outer part so that the tangs are insertable into the notches. One end of each tang is elongated to form a tang tab and a tang notch disposed between the tang and the tang tab. When the inner and outer parts are joined, the tabs of the outer part move over and behind the tang tabs of the inner part and lock in a rest position in the tang notches. Meanwhile, the tang tabs move under and behind the tabs of the outer part and lock in a rest position behind the tabs. The forces necessary to engage and disengage this connection are of small magnitude, and are capable of being applied easily without the aid of tools. This instigates a reduction in the time needed to clean the brewing appliance, and in the appliance's total down time. This can lead to increased profits from the appliance.

11 Claims, 3 Drawing Sheets

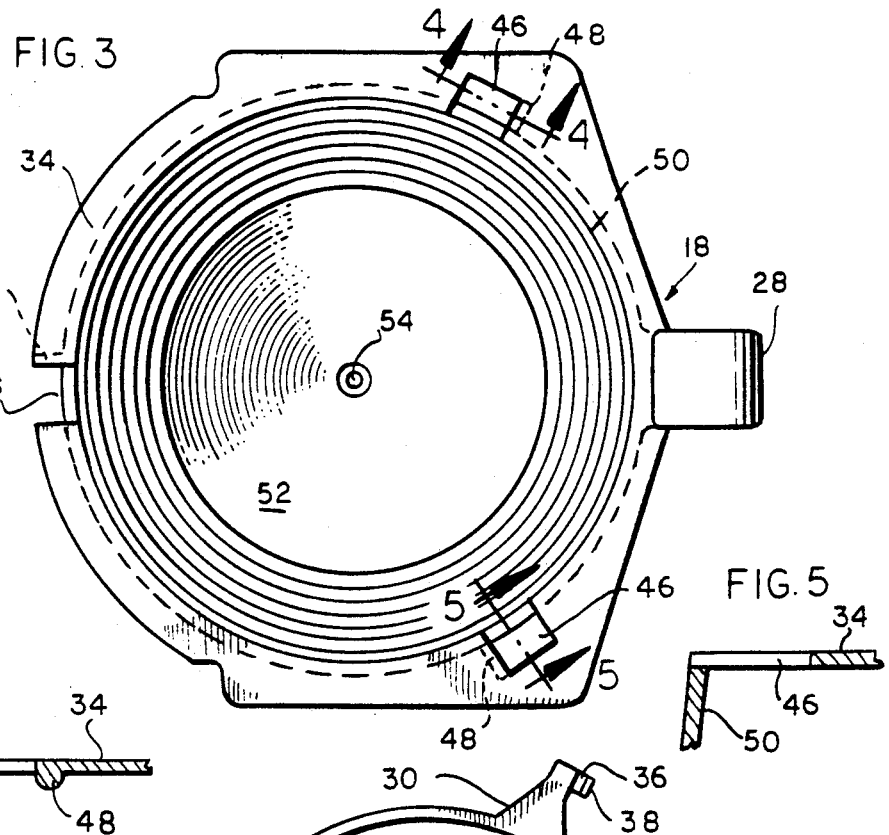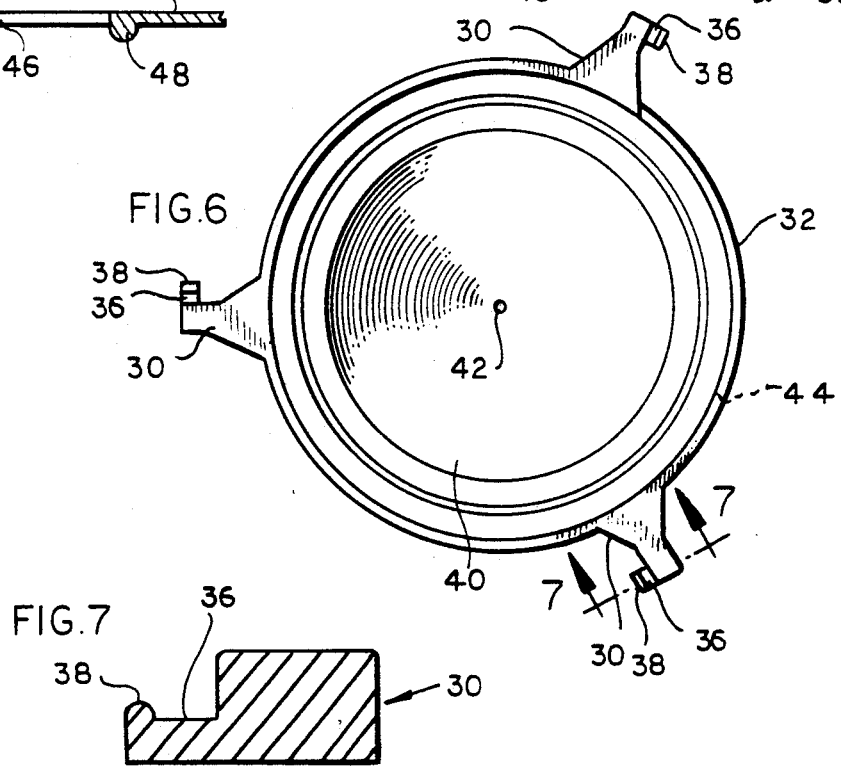

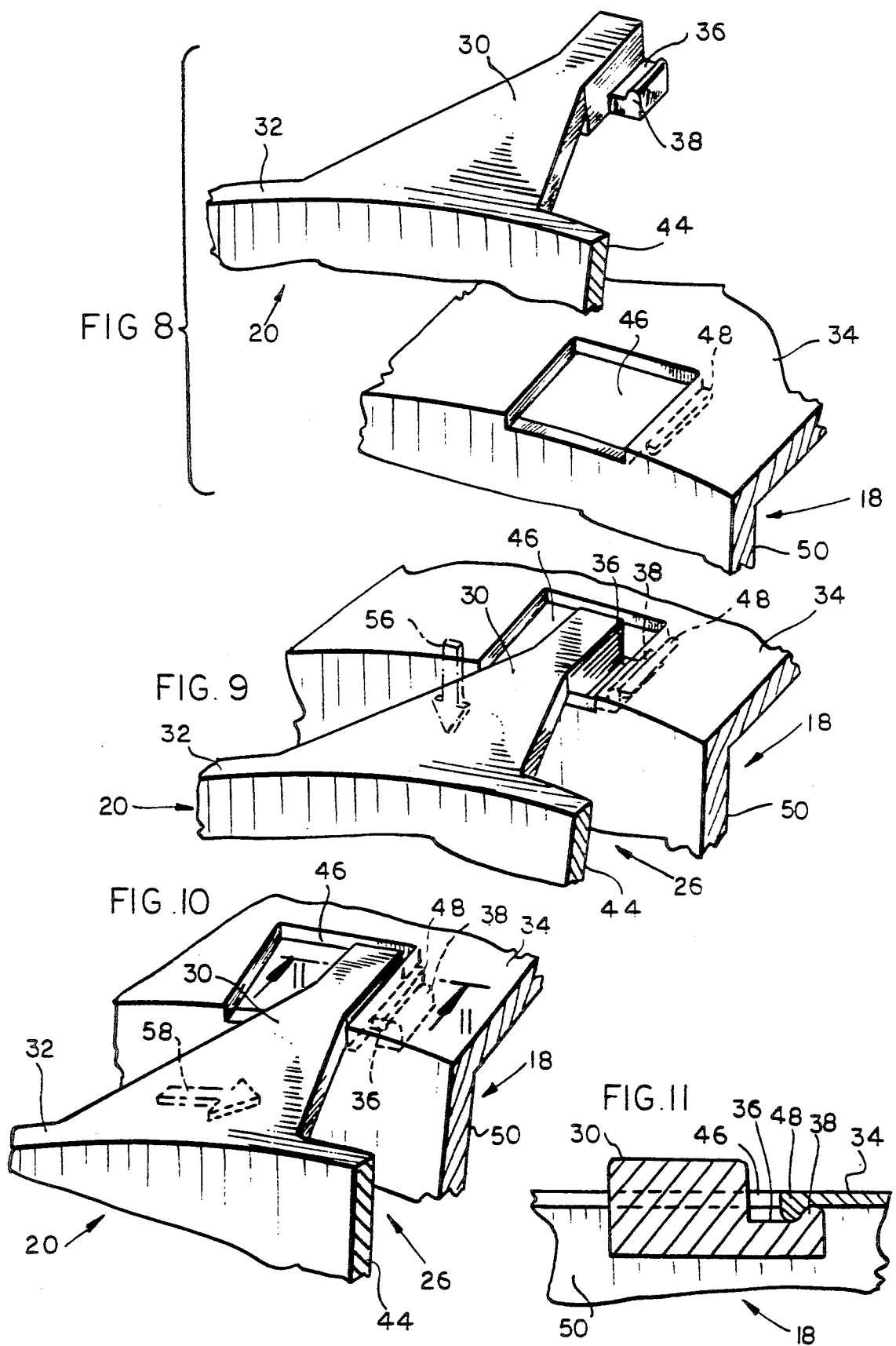

BYPASS BASKET STRUCTURE FOR ICED TEA MAKERS

BACKGROUND OF THE INVENTION

This invention generally relates to improvements in basket funnels for use with beverage making appliances, and more specifically with brewing appliances. The basic structure of a basket funnel for use with a beverage making appliance is well known, and is disclosed, for example, in the following patents:

| Anson et al. | 4,920,871 | 5-1-90 |
| --- | --- | --- |
| Hartley | 4,765,896 | 8-23-88 |
| Zimmerman | 4,642,190 | 2-10-87 |
| Daugherty | 4,603,620 | 8-5-86 |
| Stover | 4,579,048 | 4-1-86 |
| Stover | 4,309,939 | 1-12-82 |
| Stover | 4,303,525 | 12-1-81 |
| Martin | 3,861,285 | 1-21-75 |
| Martin et al. | 3,610,132 | 10-5-71 |
| Martin | 3,374,897 | 3-26-68 |

From the above prior art, it is clear that a two-part funnel, having inner and outer parts, has been in use for some time in making hot, freshly brewed beverages. However, only recently has a two-part funnel been employed successfully in making cold, freshly brewed beverages.

In this employment, disclosed fully in the patent of Anson et al., U.S. Pat. No. 4,920,871, and a pending application of Brewer, Ser. No. 07/496,887, filed on Mar. 21, 1990, an inner part of the funnel retains a filter which contains brewing material, such as ground coffee, tea leaves, or the like. Hot water is sprayed into this inner part and upon the brewing material, thus commencing the brewing process. The hot, freshly brewed beverage concentrate then is discharged through an opening in the bottom of the inner part of the funnel into the bottom of the outer part of the funnel.

While the freshly brewed beverage concentrate exits at the bottom of the inner part of the funnel, cold water enters at the top of the outer part of the funnel, and travels downwardly to meet the hot, freshly brewed beverage concentrate at the bottom of the outer part of the funnel. The cold water mixes with the hot beverage concentrate to produce a cold, freshly brewed beverage. The beverage then exits the funnel altogether through an opening in the bottom portion of the outer part of the funnel, and then enters a decanter, or other container.

This type of beverage making demands a funnel with inner and outer parts having strong construction and connections. It is important that the inner part of the funnel be joined securely to the outer part of the funnel so that the two parts may be handled as a unit. This need led to funnel constructions that required tools for disassembly for cleaning. Although effective, this means of securing the parts of the funnel together resulted in heightened time consumption when cleaning was needed, due to the elaborate means employed for joining the parts of the funnel together. This increased time period is undesirable, especially considering the commercial setting in which many of these brewing appliances are employed. In that setting, every moment the brewing appliance is not capable of producing freshly brewed beverages—the appliance's down time—represents lost revenue to the operator of the appliance.

OBJECTS AND SUMMARY OF THE INVENTION

A general object of the present invention is to provide a multi-part brewing funnel having a locking connection between the parts of the funnel which ensures the proper positioning of the parts of the funnel, and the security with which that positioning is maintained.

Another object of the invention is to provide a means for connecting the outer and inner parts of a brewing funnel that does not require tools to engage or disengage the connection.

A further object of the invention is to provide a means for connecting the outer and inner parts of a brewing funnel that is easily operated so that the ease of disengaging and engaging the connection will decrease the appliance's down time, and thereby increase revenue derived from the operation of the brewing appliance.

The means of the invention is comprised of a unique combination of a plurality of tabs and notches disposed on the top portions of both the inner and outer parts of the brewing funnel. Tang tabs and tang notches of the inner part are disposed on tangs which are insertable into the notches of the outer part. The tangs then are rotated so that the tabs of both parts confront each other, thereby causing the tang tabs of the inner part to move under and behind the tabs of the outer part. The tabs of the outer part move over and behind the tang tabs of the inner part, and lock in a rest position in the tang notches of the inner part.

This construction provides a secure means for connecting the parts of the funnel in a precise position. This is necessary for the proper operation of the beverage making device, and the production of the cold, brewed beverage. Also, this connecting means is of such a construction that the forces needed to insert the tangs into the notches of the outer part, to rotate the tabs into proper locking position, and to reverse that process to disengage that connection are small enough so that they may be applied easily by an operator without the use of tools.

This makes the cleaning of brewed beverage appliances easier and less time consuming. Because the cleaning time necessary is shortened, the total down time of the appliance is reduced. This results in decreased loss in revenue, and increased profits from the brewed beverage appliance.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 3 is a top plan view of the outer part of the funnel, clearly showing the disposition of the notches and tabs of that part;

FIG. 4 is a further enlarged fragmentary view of the outer part, taken along line 4—4 of FIG. 3, showing the relation of the tabs and notches of that part;

FIG. 5 is an enlarged fragmentary sectional view, taken along line 5—5 of FIG. 3, showing the relation of the notches and upper flange of the outer part;

FIG. 6 is a top plan view of the inner part of the funnel, clearly showing the disposition of the tangs, tang notches, and tang tabs;

FIG. 7 is an enlarged sectional view of a tang of the inner part, taken along line 7—7 of FIG. 6, showing the construction of the tang tab and tang notch;

FIG. 8 is a fragmentary enlarged perspective view of the inner and outer parts of the funnel, showing the disposition of those parts and their tabs and notches, just before the inner part is joined to the outer part;

FIG. 9 is a fragmentary perspective view similar to FIG. 8, but showing the disposition of the inner and outer parts and their tabs and notches in an intermediate stage of assembly;

FIG. 10 is similar to FIG. 9., but showing the disposition of the parts and their tabs and notches, in a fully assembled condition;

FIG. 11 is a fragmentary sectional view of the tabs and notches of the funnel, taken along line 11—11 of FIG. 10.

DETAILED DESCRIPTION OF THE PREFERRED EMBODIMENT

Figure 1:
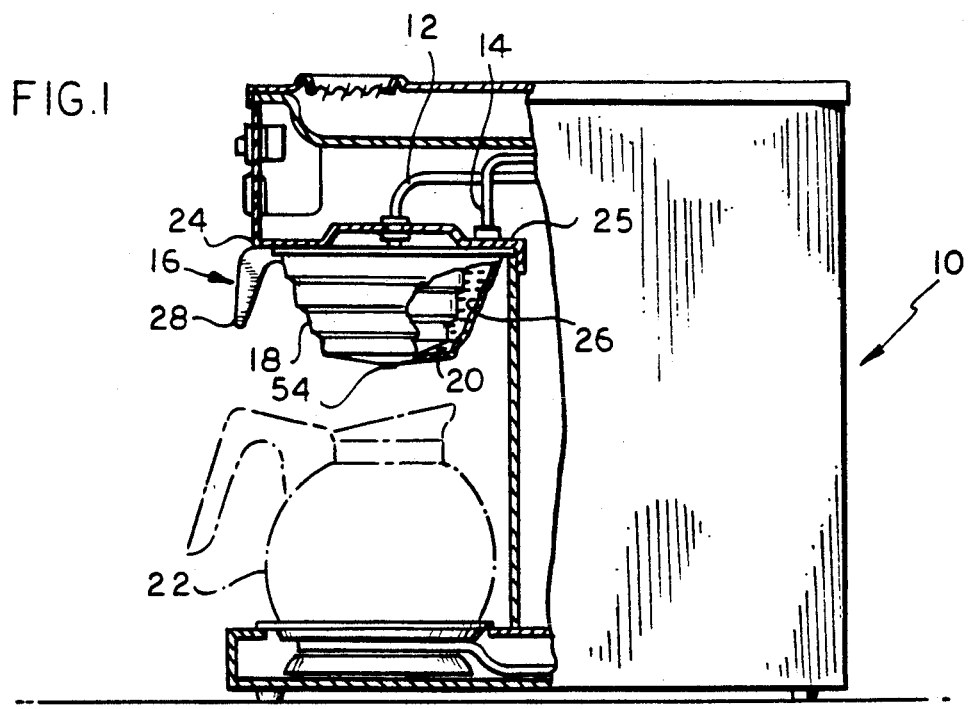
FIG. 1 is a side partial cut-away view of a brewing appliance supporting a brewing funnel constructed according to the teachings of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

In FIG. 1, a brewing appliance 10 is shown possessing a two-part brewing funnel 16 constructed according to the teachings of the present invention, and having an outer part 18 and an inner part 20. The particular brewing appliance 10 depicted in FIG. 1 is substantially similar, except for the differences herein described pertaining to the means for connecting the outer part 18 and inner part 20 of the brewing funnel 16, to the appliance disclosed in the patent of Anson et al., U.S. Pat. No. 4,920,871, and the pending application of Brewer, Ser. No. 496,887. Both of these are assigned to the assignee of the present application, and the disclosures of these are incorporated herein by this reference.

The brewing appliance 10 has a hot water line 12 and a cold water line 14 disposed about, and protruding through a funnel mounting portion 24, so that cold water can be delivered to a space 26 in the funnel 16 between the outer part 18 and inner part 20, and so that hot water can be delivered to the inner part 20. The brewing funnel 16 is mounted on and below the funnel mounting portion 24 of the brewing appliance 10. To accomplish this mounting, an upper portion 32 of the inner part 20, and an upper flange 34 of the outer part 18 of the brewing funnel 16 abut the funnel mounting portion 24 of the brewing appliance 10. Further, the upper portion or upper flange 34 of the outer part 18 is flattened and elongated radially outward so as to be insertable into a slot 25, provided by rails, of the funnel mounting portion 24 of the brewing appliance 10. This insertion gives the brewing funnel 16 sufficient support to maintain it in proper position under the funnel mounting portion 24 for the brewing process.

Figure 2:
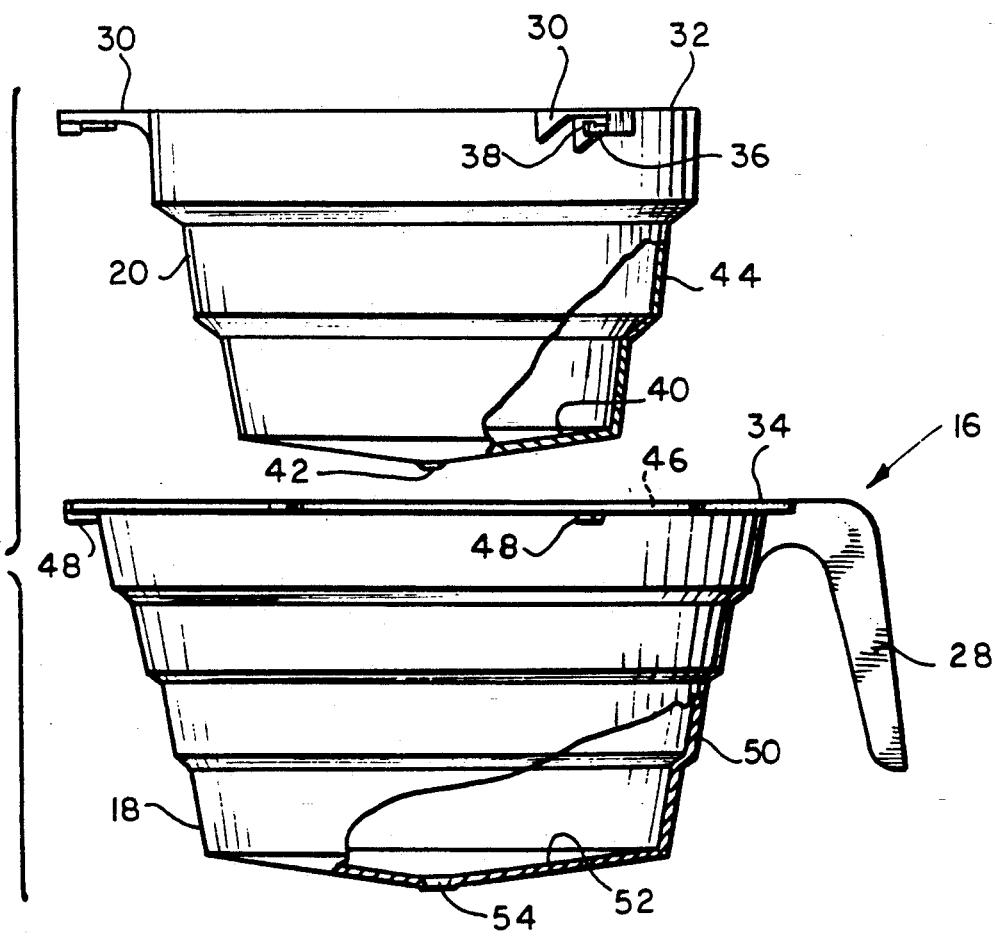
Fig. 2 is an enlarged partial cut-away exploded side view of the inner and outer parts of a brewing funnel constructed according to the teachings of the present invention.

The construction of the brewing funnel 16, and more importantly the construction of the means for connecting the inner part 20 and the outer part 18, embodies a significant concept of the invention. Referring generally to FIG. 2 and Fig. 3, the structure of the outer part 18 of the brewing funnel 16 is disclosed. The outer part 18 of the brewing funnel 16 is comprised of the peripheral upper flange 34 and a bottom portion 52 connected by a substantially cylindrical wall 50. The substantially cylindrical wall 50 has a frusto-conical shape, and gives the outer part 18, and thereby the brewing funnel 16, a generally frusto-conical shape. The substantially cylindrical wall 50 has a textured surface to make that wall 50, and thereby the brewing funnel 16, easily gripable, which aids in reducing the time needed to clean the brewing appliance 10.

A further aid to the cleaning process is the disposition of a handle 28 about the outer part 18 of the brewing funnel 16. The handle 28 allows the quick translation of the brewing funnel 16 under the funnel mounting portion 24, and also allows for easy manipulation of the brewing funnel 16 during the cleaning process. The bottom portion 52 of the outer part 18 is substantially dish-shaped, and slopes downwardly towards its center, where an opening 54 is disposed. It is through this opening 54 that the freshly brewed cold beverage flows from out of the brewing funnel 16 and into a decanter 22, shown in phantom in FIG. 1, disposed below the opening 54. The upper flange 34 of the outer part 18 is substantially horizontal and flat. This allows for the mounting of the brewing funnel 16 below the funnel mounting portion 24, as discussed above.

The upper flange 34 of the outer part 18 has a plurality of circumferentially spaced, depending tabs 48 and notches 46 disposed about it. These tabs or ribs 48 and notches 46 comprise a portion of the means for connecting the inner part 20 and the outer part 18, and are strategically located so as to provide support to the inner part 20.

The particular construction of the tabs 48 and notches 46 of the outer part 18 of the brewing funnel 16 is disclosed more fully in FIG. 4 and FIG. 5. The upper flange 34 of the outer part 18 is enlarged downwardly in a few locations, determined as disclosed above, to form depending tabs or ribs 48, as shown in FIG. 4. Also in the upper flange 34 of the outer part 18, notches 46 are disposed close to the location of the tabs 48. The notches 46 are of substantially rectangular shape, and form apertures in the upper flange 34 of the outer part 18, for receiving a tang 30 on a upper portion 32 of the inner part 20, as will be described below. Each notch 46 is disposed close to one of the tabs 48, with one side of the notches 46 abutting, and preferably being defined by a tab 48. As shown in FIG. 5, the notches 46 extend from the interior of the outer part 18 a certain distance outwards through the upper flange 34 of the outer part 18. This particular construction is desirable because there is no added impediment to oppose the insertion of the tangs 30.

Referring generally to FIG. 2 and FIG. 6, the construction of the inner part 20 is disclosed. The inner part 20 is comprised of an upper portion 32 and a bottom portion 40 connected by a substantially cylindrical wall 44. The substantially cylindrical wall 44 has a frusto-conical shape. The inner part 20 has a radius that is substantially smaller than that of the outer part 18. This allows the inner part 20 to be inserted into the outer part 18, leaving the space 26 between the two parts 18 and 20. It is through this space 26 that the cold water travels downwardly to meet the hot freshly brewed beverage concentrate, where they mix together, forming a freshly brewed beverage. The bottom portion 40 of the inner part 20 is substantially dish-shaped, and slopes downwardly towards its center, where an opening 42 is disposed. It is through this opening 42 that the freshly brewed hot beverage concentrate flows out from the inner part 20 and into the outer part 18 of the brewing funnel 16, which surrounds the inner part 20, to mix with cold water to form a diluted, freshly brewed beverage. The upper portion 32 of the inner part 20 is substantially horizontal and flat, but portions of that upper portion 32 are elongated substantially radially outward, at strategically located positions as discussed above, to form a plurality of laterally projecting tangs 30. These tangs 30 are insertable into the notches 46 in the upper flange 34 of the outer part 18 to form a connection between the two parts 18 and 20.

The particular construction of the tangs 30 is disclosed more fully in FIG. 7. One end of each of the tangs 30 extends tangentially to the upper portion 32 of the inner part 20 to form a tang notch 36 and a tang tab 38. The tang notch 36 is disposed between the tang tab 38 and the tang 30, with one edge of the tang notch 36 abutting the tang tab 38. The disposition of the tabs 48, notches 46, tangs 30, tang tabs 38, and the tang notches 36 must be coordinated so that they allow for the proper placement and attachment of the inner part 20 within the outer part 18 of the brewing funnel 16.

Further construction, disposition, and properties of the notches 46, the tabs 48, the tangs 30, the tang notches 36, and the tang tabs 38 will become more evident by means of reference to FIG. 8, FIG. 9, FIG. 10, and FIG. 11, which depict the proper process of connecting the inner part 20 to the outer part 18 of the brewing funnel 16. Beginning with FIG. 8, the inner part 20 has been disposed above and inside the outer part 18, with the notches 46 of the outer part 18 being located below the tangs 30 of the inner part. Then, as shown in FIG. 9, a downward force 56, represented in phantom by a vertical arrow, is applied to the inner part 20 of the brewing funnel 16 to achieve a relative axial movement between the parts. With the application of this downward force 56, the tangs 30 of the inner part 20 become disposed within the notches 46 of the outer part 18. This also brings the tabs 48 of the outer part 18 into abutment with the tang tabs 38 of the inner part 20.

This being done, a relative rotational force 58, as shown in FIG. 10 in phantom by a horizontal arrow, is applied to the inner part 20. The application of this rotational force 58 causes the upper portion 32 and the tangs 30 to flex, allowing the tang tabs 38 of the inner part 20 to move under and snap behind the tabs 48 of the outer part 18, and to lock in a rest position behind the tabs 48 of the outer part 18. At the same time, the rotational force 58 causes the upper flange 34 to flex, allowing the tabs 48 of the outer part 18 move over and behind the tang tabs 38 of the inner part 20, and lock in a rest position behind the tang tabs 38 in the tang notches 36 of the tangs 30. The locked position of the tabs 48, notches 46, tang tabs 38, and tang notches 36 is shown completely in FIG. 11.

The parts 18 and 20 are formed of a suitable material, such as plastic, which has sufficient resiliency to enable the tangs 30, the upper portion 32, and the upper flange 34 to flex in order to permit the tang tabs 38 and the tabs 48 to be snapped into and out of interengagement during assembly and disassembly of the funnel 16. Preferably, the tabs or ribs 38 and 48 have rounded or inclined mating surfaces to promote a camming action which facilitates snapping of the tabs into and out of interlocking engagement during assembly and disassembly of the parts. Thus, the parts 18 and 20 can easily be assembled without the aid of separate fasteners or tools.

This process assures the proper functioning of the brewing funnel 16. Once this connection has been established, the inner part 20 is locked in place in the outer part 18, and the brewing funnel 16 is properly constructed and ready for insertion into the slot 25 of the brewing appliance 10 for brewing operation. The downward force 56 and the rotational force 58 are of such a magnitude that they are able of being applied easily, by hand, without the use of tools. This results in a reduction of the time needed to clean the brewing appliance 10, and a reduction in the total down time of the appliance.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

THE INVENTION CLAIMED IS:

1. A brewing funnel for use with a beverage brewing appliance, such as an iced tea maker and the like, comprising: an outer part having a upper flange; an inner part having an upper portion; the inner part being insertable into the outer part; the upper flange including tabs at certain locations, and notches disposed in proximity to the tabs; the upper portion including laterally projecting tangs at certain locations for removable insertion into the notches; one end of each of the tangs including a tang tab; and the tabs of the outer part, and the tang tabs of the inner part forming a releasable locking connection between the inner part and the outer part.

2. A brewing funnel comprising the elements of claim 1 wherein the tang tabs will move, upon the application of a rotational force upon either the inner part or the outer part, under and behind the tabs of the outer part, and cause the tabs of the outer part to move over and behind the tang tabs; and the force being of small magnitude so as to be applied easily, by hand, without the aid of tools.

3. A brewing funnel comprising the elements of claim 1 wherein the tang tabs lock in a rest position behind the tabs of the outer part.

4. A brewing funnel comprising the elements of claim 1 wherein the tangs include tang notches abutting one side of each of the tang tabs, so that the tabs of the outer part can lock in a rest position in the tang notches of the inner part behind the tang tabs.

5. A brewing funnel comprising the elements of claim 1 wherein the outer part of the brewing funnel has a bottom portion and a wall connecting the bottom portion to the upper flange of the outer part; and the wall having a textured surface so as to make the brewing funnel easily gripable.

6. A brewing funnel comprising the elements of claim 1 wherein a handle is disposed about the outer part.

7. A brewing funnel comprising the elements of claim 1 wherein a space is disposed between the inner part and the outer part, so that a fluid may flow between those parts.

8. A brewing funnel for use with a beverage brewing appliance, such as an iced tea maker and the like, comprising: an outer part having a upper flange; an inner part having an upper portion; the inner part being insertable into the outer part; the upper flange including, at certain locations, a plurality of tabs; a plurality of notches disposed in the upper flange in proximity to the tabs; the upper portion of the inner part including a plurality of laterally projecting tangs, at certain locations; one end of each of the tangs being elongated tangentially to the upper portion of the inner part to form a tang notch and a tang tab; the tang notches being disposed between the tangs and the tang tabs; disposition of the tangs on the inner part being coordinated with disposition of the notches on the outer part so that the tangs are insertable into the notches; the tabs and notches of the outer part, and the tangs, tang notches, and tang tabs of the inner part forming a locking connection between the inner part and the outer part; and the locking connection being capable of actuation manually without the use of tools.

9. A brewing funnel comprising the elements of claim 8 wherein the tang tabs will move, upon the application of a rotational force upon either the inner part or the outer part, under and behind the tabs of the outer part, and cause the tabs of the outer part to move over and behind the tang tabs; and the force being of small magnitude so as to be applied easily, by hand, without the aid of tools.

10. A brewing funnel comprising the elements of claim 8 wherein a handle is disposed about the outer part.

11. A brewing funnel comprising the elements of claim 8 wherein a space is disposed between the inner part and the outer part, so that a fluid may flow between those parts.

* * * * *